United States Patent
Chin et al.

(10) Patent No.: US 9,185,533 B2
(45) Date of Patent: Nov. 10, 2015

(54) COMBINING VOICE CALLS IN A MULTI-SIM DEVICE

(71) Applicant: QUALCOMM Incorporated, San Diego, CA (US)

(72) Inventors: Tom Chin, San Diego, CA (US); Guangming Shi, San Diego, CA (US); Kuo-Chun Lee, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 25 days.

(21) Appl. No.: 13/957,317

(22) Filed: Aug. 1, 2013

(65) Prior Publication Data

US 2014/0038569 A1 Feb. 6, 2014

Related U.S. Application Data

(60) Provisional application No. 61/679,617, filed on Aug. 3, 2012.

(51) Int. Cl.
| | |
|---|---|
| *H04M 1/00* | (2006.01) |
| *H04W 4/16* | (2009.01) |
| *H04W 88/06* | (2009.01) |
| *H04W 76/02* | (2009.01) |
| *H04W 76/04* | (2009.01) |
| *H04W 88/18* | (2009.01) |

(52) U.S. Cl.
CPC ............. *H04W 4/16* (2013.01); *H04W 88/06* (2013.01); *H04W 76/025* (2013.01); *H04W 76/04* (2013.01); *H04W 76/045* (2013.01); *H04W 88/181* (2013.01)

(58) Field of Classification Search
USPC ............... 455/550.1, 552.1, 127.4, 553.1
See application file for complete search history.

(56) References Cited

U.S. PATENT DOCUMENTS

| | | | |
|---|---|---|---|
| 2009/0131054 A1 | 5/2009 | Zhang | |
| 2009/0305737 A1* | 12/2009 | Bae et al. | 455/552.1 |
| 2010/0322259 A1* | 12/2010 | Garg et al. | 370/401 |
| 2011/0237297 A1* | 9/2011 | Shin | 455/558 |
| 2012/0058748 A1 | 3/2012 | Jeung et al. | |

FOREIGN PATENT DOCUMENTS

EP 2466984 A1 6/2012

OTHER PUBLICATIONS

International Search Report and Written Opinion—PCT/US2013/053490—ISA/EPO—Apr. 12, 2013.

* cited by examiner

*Primary Examiner* — Joel Ajayi
(74) *Attorney, Agent, or Firm* — Seyfarth Shaw LLP

(57) ABSTRACT

A process includes receiving a first communication on a first call associated with a first subscriber identity module (SIM) in an user equipment (UE). The process further includes receiving a second communications on a second call associated with a second SIM in the UE. The process also includes outputting from the UE the received first communications and the received second communications. The process further includes selectively transmitting communications from the UE to an active call selected from one of the first call or the second call.

16 Claims, 8 Drawing Sheets

COMBINING VOICE CALLS IN A MULTI-SIM DEVICE

CROSS-REFERENCE TO RELATED APPLICATION

This application claims the benefit under 35 U.S.C. §119 (e) to U.S. Provisional Patent Application No. 61/679,617, entitled, COMBINING VOICE CALLS IN A MULTI-SIM DEVICE, filed on Aug. 3, 2012, in the names of CHIN, et al., the disclosure of which is expressly incorporated by reference herein in its entirety.

BACKGROUND

1. Field

Aspects of the present disclosure relate generally to wireless communication systems, and more particularly, to combining voice calls in a multi-subscriber identity module (SIM) device operating in a TD-SCDMA network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method for wireless communication includes receiving first communications on a first call associated with a first subscriber identity module (SIM) in an user equipment (UE). The method may also include receiving second communications on a second call associated with a second SIM in the UE. The method may also include outputting from the UE the received first communications and the received second communications. The method may further include selectively transmitting communications from the UE to an active call selected from one of the first call or the second call.

According to one aspect of the present disclosure, a method for wireless communication includes communicating in a first call associated with a first subscriber identity module (SIM) in an user equipment (UE), the first call using a vocoder mode. The method may also include requesting the vocoder mode of the first SIM when setting up a second call associated with a second SIM in the UE.

According to another aspect of the present disclosure, an apparatus for wireless communication includes means for receiving first communications on a first call associated with a first SIM in a UE. The apparatus may also include means for receiving second communications on a second call associated with a second SIM in the UE. The apparatus may also include means for outputting from the UE the received first communications and the received second communications. The apparatus may further include means for selectively transmitting communications from the UE to an active call selected from one of the first call or the second call.

According to another aspect of the present disclosure, an apparatus for wireless communication includes means for communicating in a first call associated with a first subscriber identity module (SIM) in an user equipment (UE), the first call using a vocoder mode. The apparatus may also include means for requesting the vocoder mode of the first SIM when setting up a second call associated with a second SIM in the UE.

According to one aspect of the present disclosure, a computer program product for wireless communication in a wireless network includes a computer readable medium having non-transitory program code recorded thereon. The program code includes program code to receive first communications on a first call associated with a first subscriber identity module (SIM) in an user equipment (UE). The program code also includes program code to receive second communications on a second call associated with a second SIM in the UE. The program code also includes program code to output from the UE the received first communications and the received second communications. The program code further includes program code to selectively transmit communications from the UE to an active call selected from one of the first call or the second call.

According to one aspect of the present disclosure, a computer program product for wireless communication in a wireless network includes a computer readable medium having non-transitory program code recorded thereon. The program code includes program code to communicate in a first call associated with a first subscriber identity module (SIM) in an user equipment (UE), the first call using a vocoder mode. The program code also includes program code to request the vocoder mode of the first SIM when setting up a second call associated with a second SIM in the UE.

According to one aspect of the present disclosure, an apparatus for wireless communication includes a memory and a processor(s) coupled to the memory. The processor(s) is configured to receive first communications on a first call associated with a first subscriber identity module (SIM) in an user equipment (UE). The processor(s) is further configured to receive second communications on a second call associated with a second SIM in the UE. The processor(s) is further configured to output from the UE the received first communications and the received second communications. The processor(s) is further configured to selectively transmit communications from the UE to an active call selected from one of the first call or the second call.

According to one aspect of the present disclosure, an apparatus for wireless communication includes a memory and a processor(s) coupled to the memory. The processor(s) is configured to communicate in a first call associated with a first subscriber identity module (SIM) in an user equipment (UE), the first call using a vocoder mode. The processor(s) is further configured to request the vocoder mode of the first SIM when setting up a second call associated with a second SIM in the UE.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
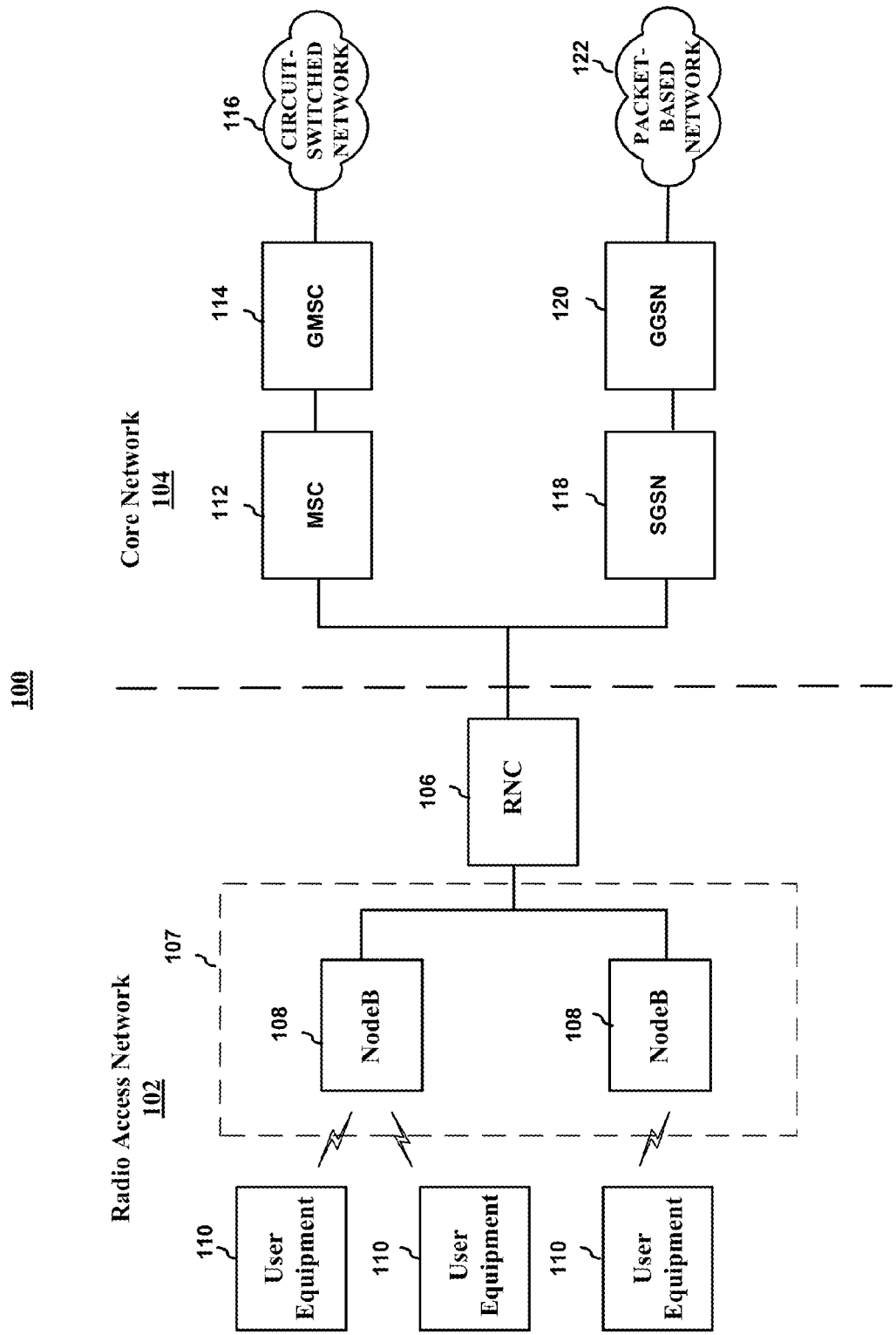
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
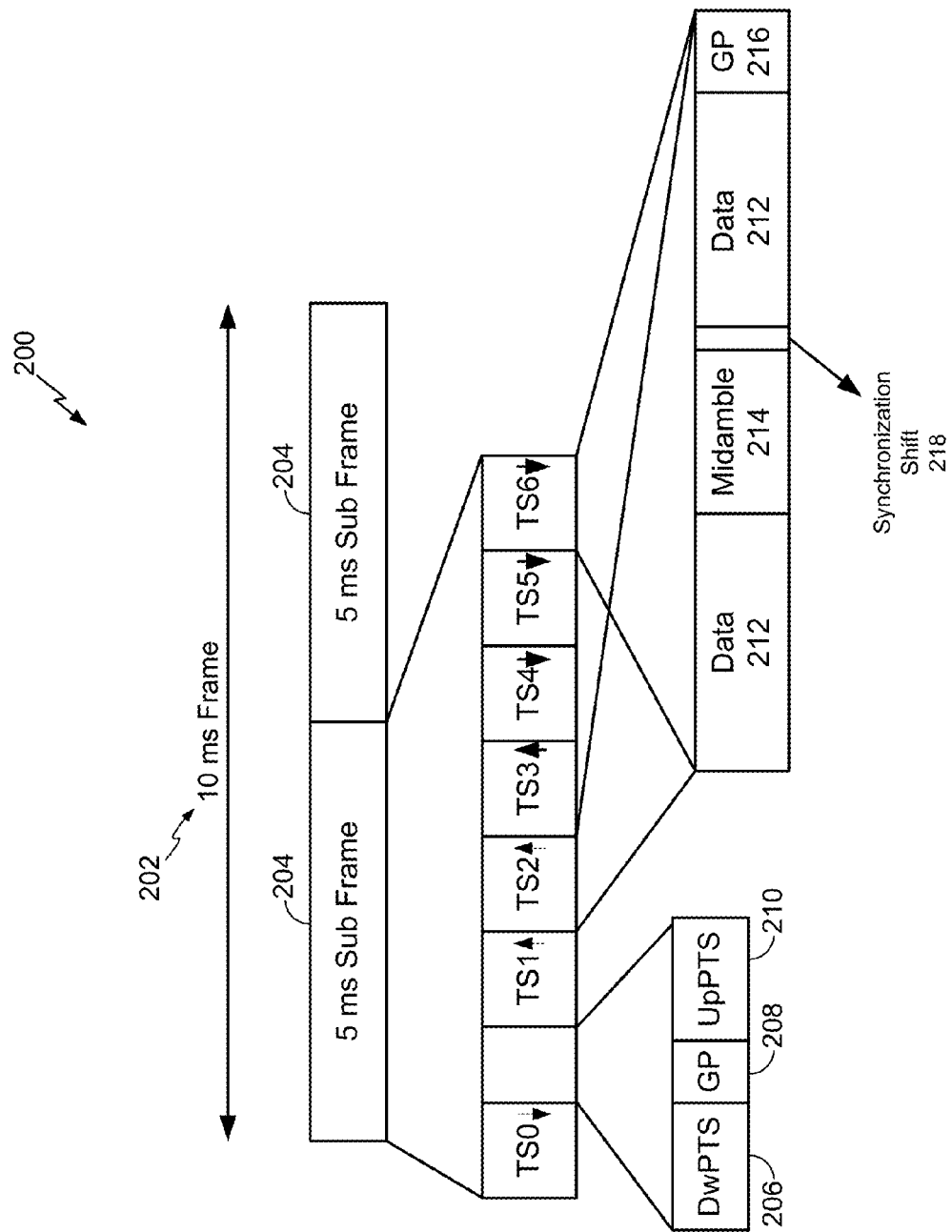
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
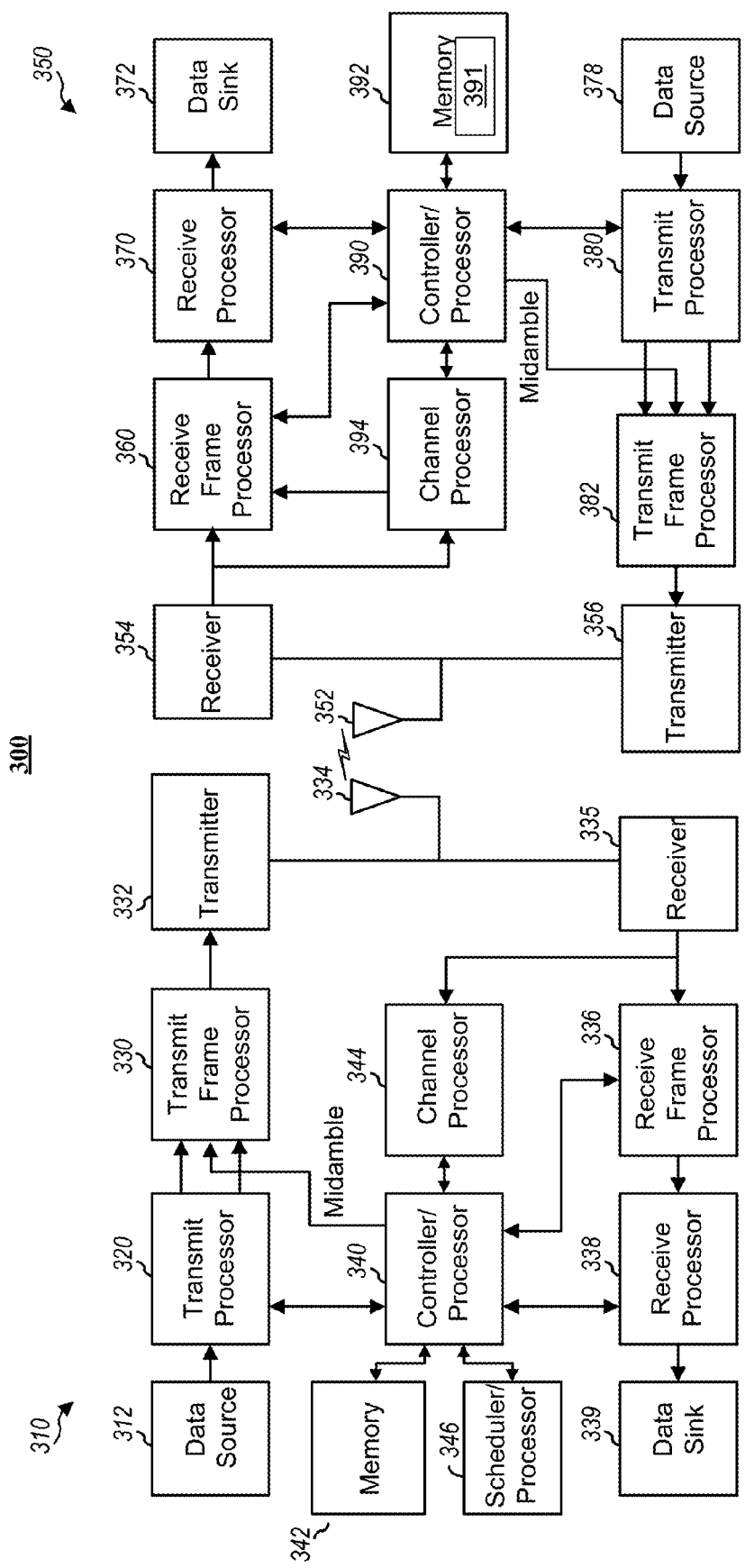
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store call combining module 391 which, when executed by the controller/processor 390, configures the UE 350 to combine multiple received calls. A scheduler/processor 346 at the node B 310 may be used to allocate resources to the UEs and schedule downlink and/or uplink transmissions for the UEs.

Combining Voice Calls in a Multi-SIM Device

In some cases, a user equipment (UE) may include more than one subscriber identity module (SIM) or universal subscriber identity module (USIM). A UE with more than one SIM may be referred to as a multi-SIM or a multi-talk UE. In the present disclosure, a SIM may refer to a SIM or a USIM. Each SIM may also include a unique International Mobile Subscriber Identity (IMSI) and service subscription information. Moreover, each SIM may be associated with a unique phone number. Therefore, the UE may use each SIM to send and receive phone calls.

In one configuration, the UE may use multiple SIMs to initiate or receive multiple phone calls. That is, the UE may simultaneously communicate via the phone numbers associated with each individual SIM. The simultaneous communication may also be referred to as dual-SIM or dual-talk. In the present disclosure, the term UE may refer to a multi-SIM or a multi-talk UE.

In another configuration, the UE may specify separate hardware modules for each SIM. The hardware modules may be modem chips or other pieces of communication hardware configured for communication on a particular network. For example, in a UE with two SIMs, a first module may be a Time Division-Code Division Multiple Access (TD-SCDMA) module associated with the first SIM and a second module may be a Global System for Mobile Communications (GSM) module associated with a second SIM. Each hardware module may also include a radio frequency (RF) module, a baseband module, and a processor. It should be noted that the modules may be separate hardware structures or a single structure that is divided into at least two modules.

Figure 4:
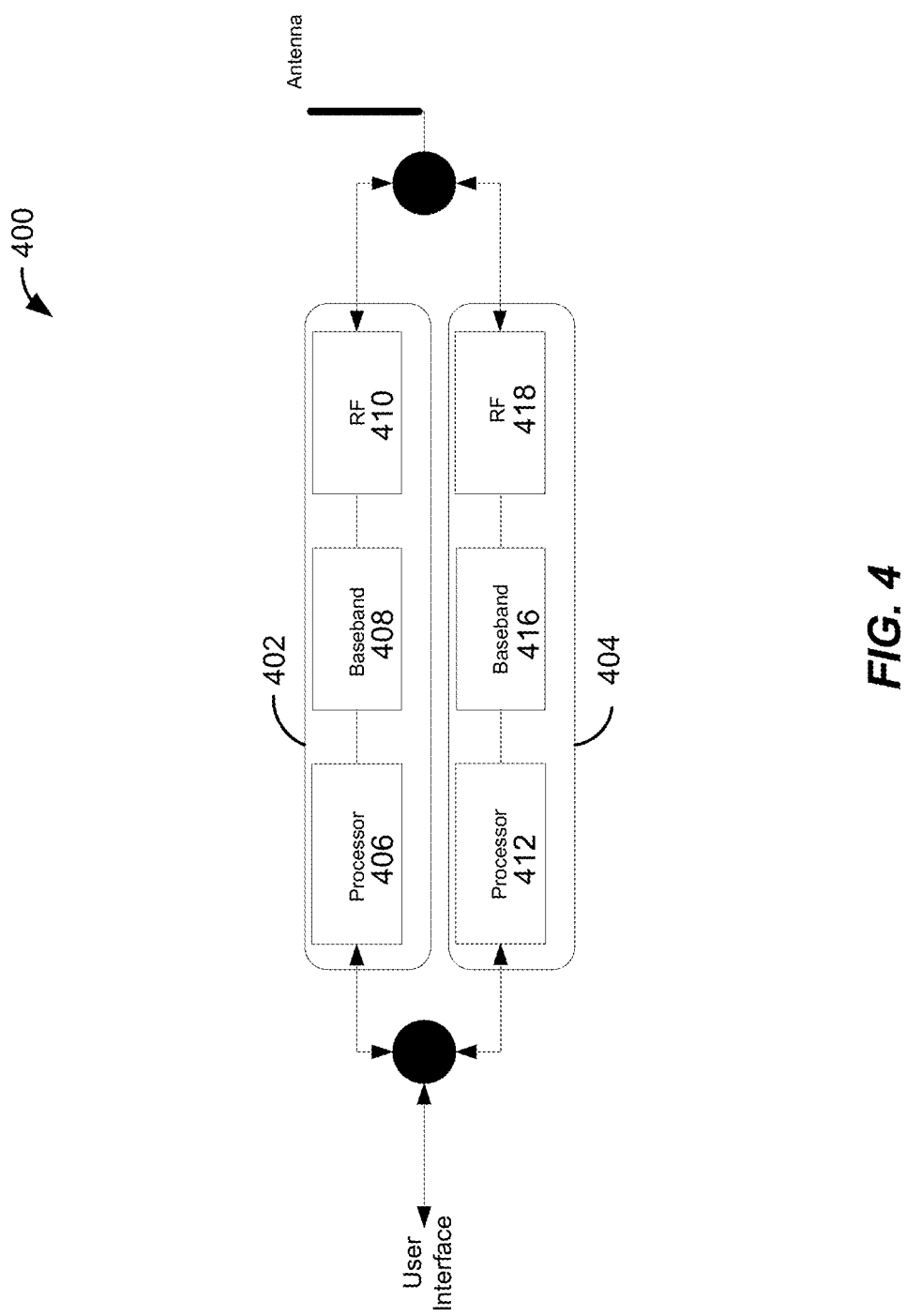
FIG. 4 is a block diagram illustrating a multi-SIM UE according to an aspect of the present disclosure.

FIG. 4 illustrates an example of a hardware configuration of a UE 400 according to an aspect of the present disclosure. As illustrated in FIG. 4, the UE may include a first module 402 and a second module 404. The first module 402 may include a first processor 406, a first baseband module 408 and a first radio frequency (RF) module 410. The second module 404 may include a second processor 412, a second baseband module 416 and a second RF module 418. Furthermore, each of the first module 402 and the second module 404 may be associated with a different SIM. For example, the first module 402 may be a TD-SCDMA module associated with a first SIM. Additionally, the second module 404 may be a GSM module associated with a second SIM. The first module 402 and the second module 404 may communicate with a user interface of the UE and may also communicate with one or more antennae of the UE.

Because the UE may receive multiple calls, the UE can manage the multiple received calls. Aspects of the present disclosure provide for a UE that is capable of simultaneously receiving and handling multiple calls. The UE can also allow multiple calls to be set up.

According to an aspect of the present disclosure, when a UE sets up multiple voice calls, a user interface may be displayed for the user to select one of the voice calls as an active call. It should be noted that the voice calls may be calls that are received at the UE and/or calls that are initiated from the UE. The voice call that is not selected as an active call may be referred to as an inactive call. The user may also switch the active call to the inactive call at any time, and may also switch the inactive call to the active call at any time. In this aspect, once the user chooses one voice call to talk on (e.g., the active call), the outgoing voice communication does not leak to other voice calls, such as the inactive calls. In this aspect, the voice calls may be made on digital lines, not analog lines.

According to another aspect of the present disclosure, the user may actively communicate only with the active call. In this aspect, the UE may only transmit voice frames to the active call and may not transmit voice frames to the inactive call even though the UE may receive voice frames from both the active call and the inactive call. The UE may maintain the connection with the inactive call by transmitting idle frames (e.g., adaptive multi-rate (AMR) codec silence indicator frames) to a connected device associated with the inactive call. In this aspect, the connection with the inactive call is still maintained while the overall bandwidth is reduced.

According to another aspect of the present disclosure, the UE may combine the received voice frames of the inactive call with the received voice frames of the active call. The combined voice frames may be decoded and the analog signals of the combined voice frames may be simultaneously output from an audio output device (e.g., a speaker) of the UE. In this manner the UE may listen to audio of both calls simultaneously.

In one aspect of the present disclosure, while the connection is maintained with the active and inactive calls in the combined voice frame communications as described above, the user may switch between talking on the active and inactive calls via the user interface at any time. For example, the UE may be connected to a first device with an active call and connected to a second device with an inactive call. Accordingly, the UE may output the audio of the voice frames received from both the first and second devices. Furthermore, the UE may transmit voice frames to the first device (e.g., an active call) and transmit idle frames to the second device (e.g., an inactive call). According to the one aspect, the user may switch the active call from the first device to the second device. After switching the active call, the UE may transmit voice frames to the second device (e.g., an active call) and may transmit idle frames to the first device (e.g., an inactive call).

According to another aspect of the present disclosure, to reduce use of the vocoder memory, the voice calls that are initiated subsequent to a first voice call may use the same vocoder mode that the first voice call uses. That is, the multiple calls at the UE may use the same vocoder mode so that multiple, unnecessary instances of a processing module are not created in the memory of the UE. The TABLE 1 below shows examples of vocoder modes that may be available in GSM/TD-SCDMA/WCDMA networks.

TABLE 1

| Mode | Bitrate (kbit/s) | Channel |
| --- | --- | --- |
| AMR_12.20 | 12.2 | Full Rate (FR) |
| AMR_10.20 | 10.2 | FR |
| AMR_7.95 | 7.95 | FR/Half Rate (HR) |
| AMR_7.40 | 7.4 | FR/HR |
| AMR_6.70 | 6.7 | FR/HR |
| AMR_5.90 | 5.9 | FR/HR |
| AMR_5.15 | 5.15 | FR/HR |
| AMR_4.75 | 4.75 | FR/HR |

Figure 5:
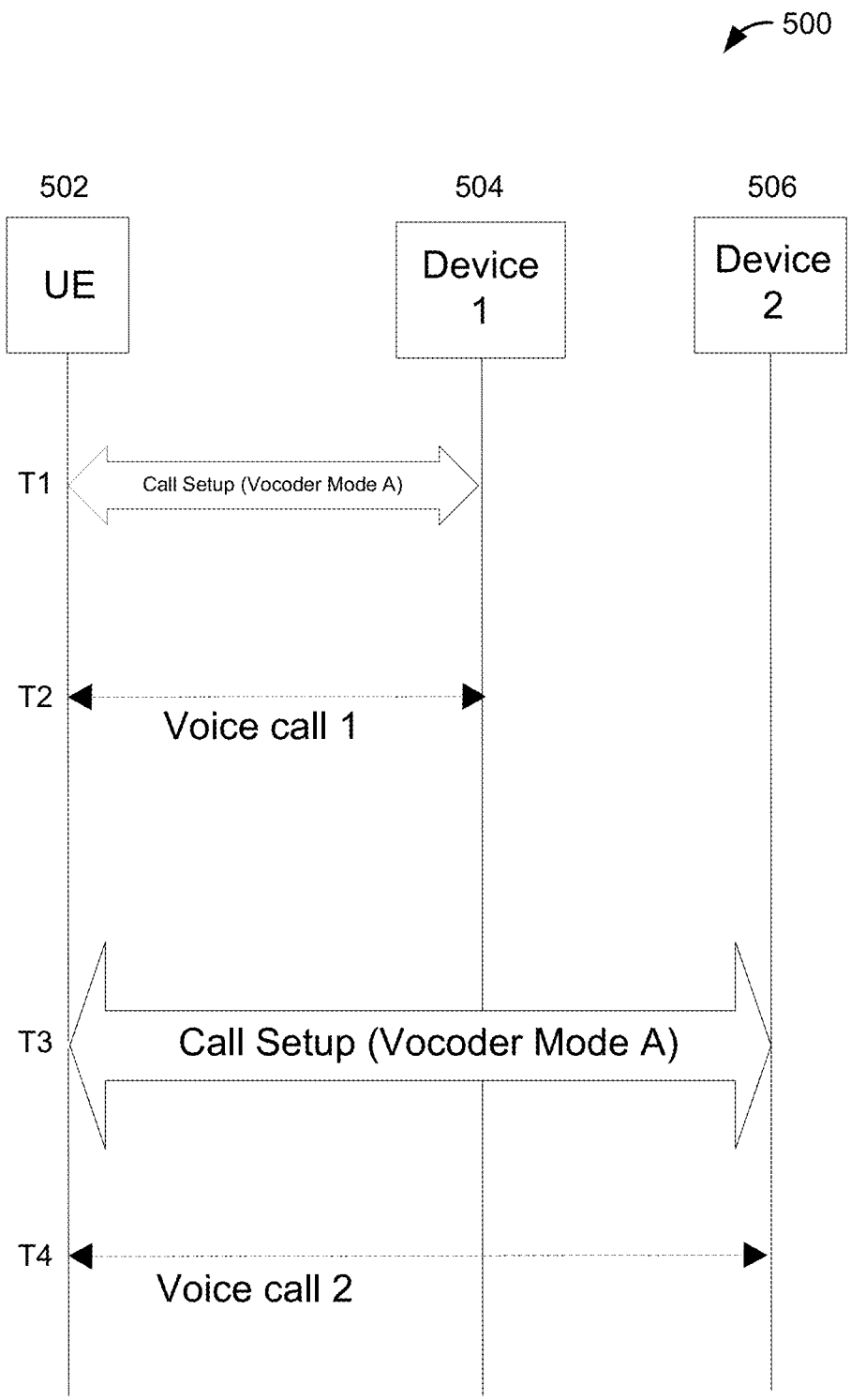
FIG. 5 is a timing diagram for a UE connecting with multiple devices according to one aspect of the present disclosure.

According to one aspect of the present disclosure, a second received call may use the same vocoder mode as the first received call. FIG. 5 illustrates an example of the second received call using the same vocoder mode of the first received call according to an aspect of the present disclosure.

As shown in FIG. 5, at time T1, a first call setup procedure using a specific vocoder mode, such as vocoder mode A, may be initiated between a first device 504 and the UE 502. The first call may be initiated by the UE 502 or the first device 504. In this example, vocoder mode A may be one of the vocoder modes of TABLE 1 or another vocoder mode that may not be reflected in TABLE 1. For example, the first device 504 may be a device operating on the TD-SCDMA network. At time T2, the voice call is established between the UE 502 and the first device 504. Furthermore, at time T3, a second call setup procedure may be initiated between the UE 502 and the second device 506. The second call may be initiated by the UE 502 or the first device 504 or the second device 506. The second call setup procedure may use the same vocoder mode of the first call setup procedure (e.g., vocoder mode A). As an example, the second device 506 may be operating on the GSM network. Finally, at time T4, a voice call may be established between the UE 502 and the second device 506.

By having both the first call and the second call use the same vocoder mode (e.g., vocoder mode A), the call setup procedure for both calls is made more efficient, reduces bandwidth and also saves memory resources in terms of processing. Typical call setup procedures may use multiple vocoder modes, or different vocoder modes for different calls. For example, a typical call setup procedure may use one vocoder mode (e.g., vocoder mode A) for the first call and another vocoder mode (e.g. vocoder mode B) for the second call.

It should be noted that aspects of the present disclosure have been presented for a UE with two SIMs. The aspects of the present disclosure may also be implemented with UEs having more than two SIMs. Furthermore, the aspects of the present disclosure are also contemplated for calls initiated or received between more than two devices, so that one call may be an active call and other calls may be inactive calls.

Figure 6A:
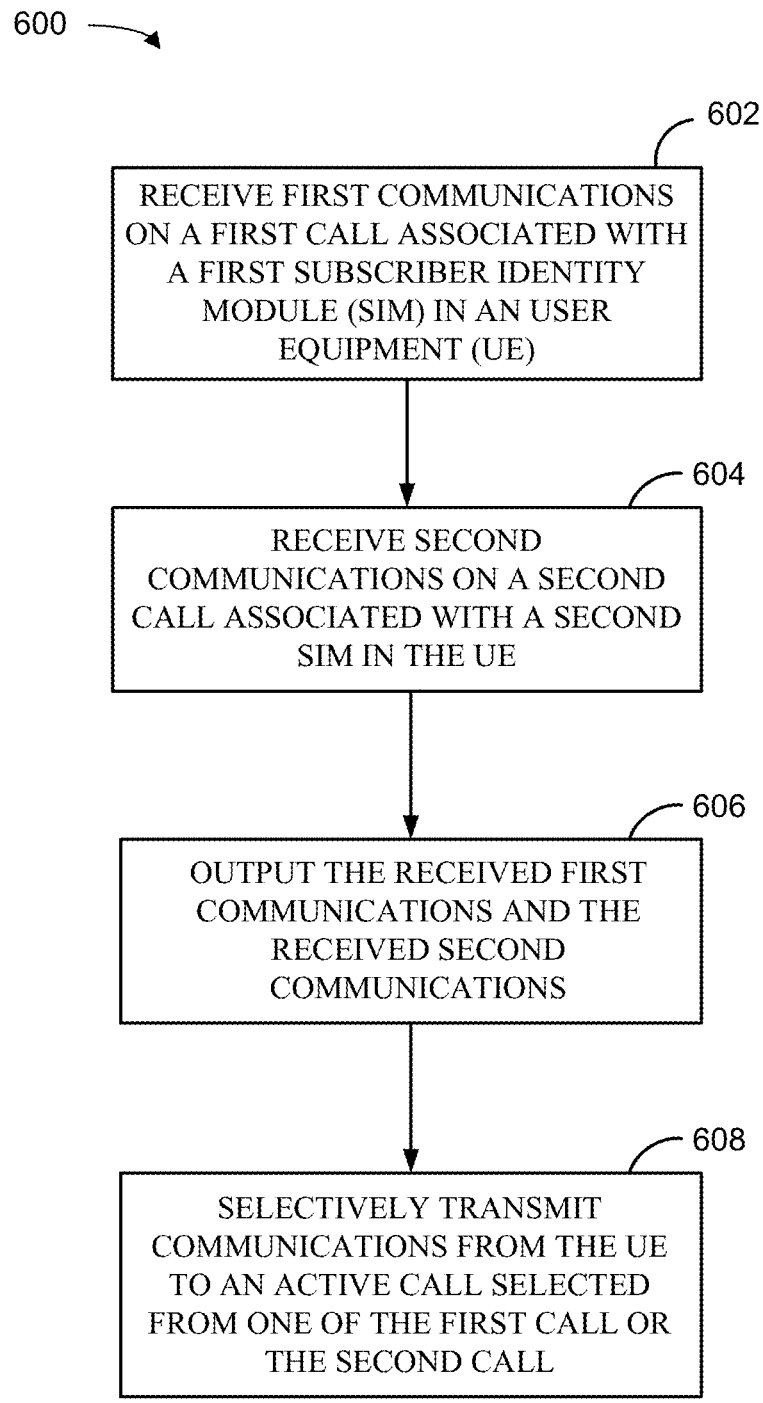
FIG. 6A is a block diagram illustrating a method for combining multiple received voice calls according to one aspect of the present disclosure.

FIG. 6A illustrates a wireless communication method 600 according to one aspect of the present disclosure. A UE receives first communications on a first call associated with a first subscriber identity module (SIM) in the UE, as shown in block 602. The UE also receives second communications on a second call associated with a second SIM in the UE, as shown in block 604. Furthermore, a UE outputs the received first communications and the received second communications, as shown in block 606. Finally, the UE selectively transmits communications from the UE to an active call selected from one of the first call or the second call, as shown in block 608.

Figure 6B:
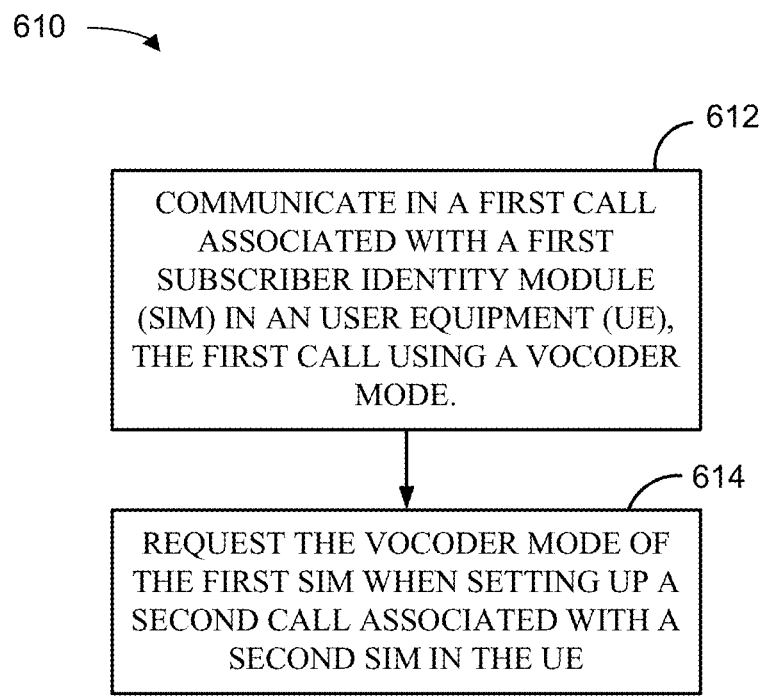
FIG. 6B is a block diagram illustrating a method for making multiple voice calls and using a vocoder mode according to one aspect of the present disclosure.

FIG. 6B shows a wireless communication method 610 according to another aspect of the present disclosure. In block 612, an user equipment (UE) communicates in a first call associated with a first subscriber identity module (SIM) in the UE, the first call using a vocoder mode. In block 614, the UE requests the vocoder mode of the first SIM when setting up a second call associated with a second SIM in the UE.

Figure 7:
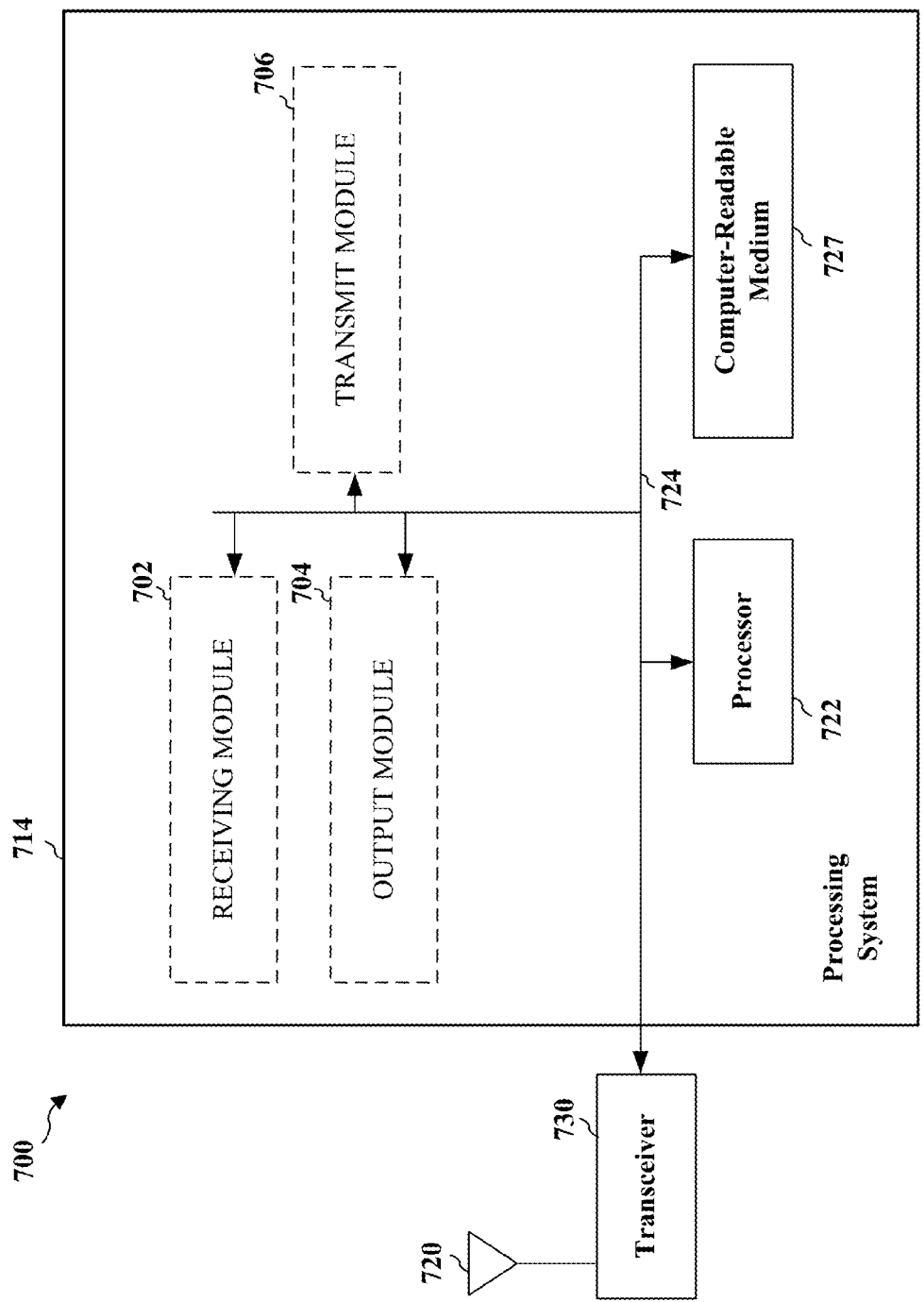
FIG. 7 is a diagram illustrating an example of a hardware implementation for an apparatus employing a processing system according to one aspect of the present disclosure.

FIG. 7 is a diagram illustrating an example of a hardware implementation for an apparatus 700 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 722 a receiving module 702, an output module 704, a transmit module 706, and the computer-readable medium 727. The bus 724 may also link various other circuits such as timing sources, peripherals, voltage regulators, and power management circuits, which are well known in the art, and therefore, will not be described any further.

The apparatus includes a processing system 714 coupled to a transceiver 730. The transceiver 730 is coupled to one or more antennas 720. The transceiver 730 enables communicating with various other devices over a transmission medium. The processing system 714 includes a processor 722 coupled to a computer-readable medium 727. The processor 722 is responsible for general processing, including the execution of software stored on the computer-readable medium 727. The software, when executed by the processor 722, causes the processing system 714 to perform the various functions described for any particular apparatus. The computer-readable medium 727 may also be used for storing data that is manipulated by the processor 722 when executing software.

The processing system 714 includes a receiving module 702 for receiving first communications on a first call associated with a first SIM in a UE and receiving second communications on a second call associated with a second SIM in the UE. The processing system 714 also includes an output module 704 for outputting the received first communications and the received second communications. The processing system 714 further includes a transmit module 706 for selectively transmitting communications from the UE to an active call selected from one of the first call or the second call. The modules may be software modules running in the processor 722, resident/stored in the computer-readable medium 727, one or more hardware modules coupled to the processor 722, or some combination thereof. The processing system 714 may be a component of the UE 350 and may include the memory 392, and/or the controller/processor 390.

In one configuration, an apparatus such as a UE is configured for wireless communication including means for receiving, means for outputting, and means for transmitting In one aspect, the above means may be the antennas 352, the receiver 354, the channel processor 394, the receive frame processor 360, the receive processor 370, the transmitter 356, the transmit frame processor 382, the transmit processor 380, the controller/processor 390, the memory 392, the call combining module 391, receiving module 702, the output module 704, the transmit module 706, and/or the processing system 714 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
receiving a first call associated with a first subscriber identity module (SIM) in an user equipment (UE);
connecting to the first call to at least receive first audio data from the first call;
receiving, while connected to the first call, a second call associated with a second SIM in the UE;
connecting to the second call to at least receive second audio data from the second call;
selecting either the first call or the second call as an active call, a call not selected as the active call being an inactive call;
simultaneously outputting, from an audio output device of the UE, audio transmissions associated with both the first audio data and the second audio data;
transmitting at least third audio data from the UE to the active call; and
transmitting an idle frame to the inactive call while at least the third audio data is transmitted to the active call, the idle frame being a frame that does not include audio data.

2. The method of claim 1, in which the first call uses a vocoder mode for first communications and the second call also uses the vocoder mode for the second communications.

3. A method of wireless communication, comprising:
receiving at least first audio of a first call associated with a first subscriber identity module (SIM) in an user equipment (UE), the first call using a vocoder mode;
receiving, while connected to the first call, at least second audio of a second call associated with a second SIM in the UE;
requesting the vocoder mode of the first SIM when setting up the second call;
simultaneously outputting, from an audio output device of the UE, audio transmissions associated with both the first audio and the second audio, such that both the first audio and the second audio use the vocoder mode of the first SIM;
transmitting at least third audio data from the UE to the first call; and
transmitting an idle frame to the second call while at least the third audio data is transmitted to the first call, the idle frame being a frame that does not include audio data.

4. The method of claim 3, further comprising
selectively transmitting communications from the UE to either the first call or the second call.

5. An apparatus for wireless communication, comprising:
means for receiving a first call associated with a first subscriber identity module (SIM) in an user equipment (UE);
means for connecting to the first call to at least receive first audio data from the first call;
means for receiving, while connected to the first call, a second call associated with a second SIM in the UE;
means for connecting to the second call to at least receive second audio data from the second call;
means for selecting either the first call or the second call as an active call, a call not selected as the active call being an inactive call;
means for simultaneously outputting, from an audio output device of the UE, audio transmissions associated with both the first audio data and the second audio data;
means for transmitting at least third audio data from the UE to the active call; and
means for transmitting an idle frame to the inactive call while at least the third audio data is transmitted to the active call, the idle frame being a frame that does not include audio data.

6. The apparatus of claim 5, in which the first call uses a vocoder mode for the first communications and the second call also uses the vocoder mode for second communications.

7. An apparatus for wireless communication, comprising:
means for receiving at least first audio of a first call associated with a first subscriber identity module (SIM) in an user equipment (UE), the first call using a vocoder mode;
means for receiving, while connected to the first call, at least second audio of a second call associated with a second SIM in the UE;
means for requesting the vocoder mode of the first SIM when setting up the second call;
means for simultaneously outputting, from an audio output device of the UE, audio transmissions associated with both the first audio and the second audio, such that both the first audio and the second audio use the vocoder mode of the first SIM;
means for transmitting at least third audio data from the UE to the first call; and
means for transmitting an idle frame to the second call while at least the third audio data is transmitted to the first call, the idle frame being a frame that does not include audio data.

8. The apparatus of claim 7, further comprising
means for selectively transmitting communications from the UE to either the first call or the second call.

9. A computer program product for wireless communication in a wireless network, comprising:
a non-transitory computer-readable medium having non-transitory program code recorded thereon, the program code comprising:
program code to receive a first call associated with a first subscriber identity module (SIM) in an user equipment (UE);
program code to connect to the first call to at least receive first audio data from the first call;
program code to receive, while connected to the first call, a second call associated with a second SIM in the UE;
program code to connect to the second call to at least receive second audio data from the second call;
program code to select either the first call or the second call as an active call, a call not selected as the active call being an inactive call;
program code to simultaneously output, from an audio output device of the UE, audio transmissions associated with both the first audio data and the second audio data;
program code to transmit at least third audio data from the UE to the active call; and
program code to transmit an idle frame to the inactive call while at least the third audio data is transmitted to the active call, the idle frame being a frame that does not include audio data.

10. The computer program product of claim 9, in which the first call uses a vocoder mode for first communications and the second call also uses the vocoder mode for second communications.

11. A computer program product for wireless communication in a wireless network, comprising:

a non-transitory computer-readable medium having non-transitory program code recorded thereon, the program code comprising:
  program code to receive at least first audio of a first call associated with a first subscriber identity module (SIM) in an user equipment (UE), the first call using a vocoder mode;
  program code to receive, while connected to the first call, at least second audio of a second call associated with a second SIM in the UE;
  program code to request the vocoder mode of the first SIM when setting up the second call;
  program code to simultaneously output, from an audio output device of the UE, audio transmissions associated with both the first audio and the second audio, such that both the first audio and the second audio use the vocoder mode of the first SIM;
  program code to transmit at least third audio data from the UE to the first call; and
  program code to transmit an idle frame to the second call while at least the third audio data is transmitted to the first call, the idle frame being a frame that does not include audio data.

12. The computer program product of claim 11, the program code further comprising
  program code to selectively transmit communications from the UE to either the first call or the second call.

13. An apparatus for wireless communication, comprising:
  a memory; and
  at least one processor coupled to the memory, the at least one processor being configured:
    to receive a first call associated with a first subscriber identity module (SIM) in an user equipment (UE);
    to connect to the first call to at least receive first audio data from the first call;
    to receive second communications, while connected to the first call, a second call associated with a second SIM in the UE;
    to connect to the second call to at least receive second audio data from the second call;
    to select either the first call or the second call as an active call, a call not selected as the active call being an inactive call;
    to simultaneously outputting, from an audio output device of the UE, audio transmissions associated with both the first audio data and the second audio data;
    to transmit at least third audio data from the UE to the active call; and
    to transmit an idle frame to the inactive call while at least the third audio data is transmitted to the active call, the idle frame being a frame that does not include audio data.

14. The apparatus of claim 13, in which the first call uses a vocoder mode for first communications and the second call also uses the vocoder mode for second communications.

15. An apparatus for wireless communication, comprising:
  a memory; and
  at least one processor coupled to the memory, the at least one processor being configured:
    to receive at least first audio of a first call associated with a first subscriber identity module (SIM) in an user equipment (UE), the first call using a vocoder mode;
    to receive, while connected to the first call, at least second audio of a second call associated with a second SIM in the UE;
    to request the vocoder mode of the first SIM when setting up the second call;
    to simultaneously output, from an audio output device of the UE, audio transmissions associated with both the first audio and the second audio, such that both the first audio and the second audio use the vocoder mode of the first SIM;
    to transmit at least third audio data from the UE to the first call; and
    to transmit an idle frame to the second call while at least the third audio data is transmitted to the first call, the idle frame being a frame that does not include audio data.

16. The apparatus of claim 15, the at least one processor being further configured
  to selectively transmit communications from the UE to either the first call or the second call.

* * * * *